(12) United States Patent
Takeuchi et al.

(10) Patent No.: US 9,466,960 B2
(45) Date of Patent: Oct. 11, 2016

(54) BINDING BAND UNIT OF ELECTRIC WIRE PASSING GUIDE

(75) Inventors: Kunihiko Takeuchi, Makinohara (JP); Fumiyoshi Ohashi, Makinohara (JP)

(73) Assignee: Yazaki Corporation, Tokyo (JP)

( * ) Notice: Subject to any disclaimer, the term of this patent is extended or adjusted under 35 U.S.C. 154(b) by 253 days.

(21) Appl. No.: 13/450,710

(22) Filed: Apr. 19, 2012

(65) Prior Publication Data
US 2012/0266415 A1 Oct. 25, 2012

(30) Foreign Application Priority Data

Apr. 20, 2011 (JP) .................................. 2011-093968

(51) Int. Cl.
| | |
|---|---|
| *B65D 63/02* | (2006.01) |
| *H02G 3/06* | (2006.01) |
| *B60R 16/02* | (2006.01) |
| *H02G 3/04* | (2006.01) |
| *H02G 3/32* | (2006.01) |

(52) U.S. Cl.
CPC ......... *H02G 3/0608* (2013.01); *B60R 16/0215* (2013.01); *H02G 3/0437* (2013.01); *H02G 3/32* (2013.01); *Y10T 24/149* (2015.01)

(58) Field of Classification Search
CPC .................................................. H02G 3/0608
USPC ................... 24/27; 439/76.2, 449, 456, 535; 174/72 A, 34, 354, 360, 367, 371, 652, 174/654, 665, 195 A, 74.1, 195 E, 68.1, 174/68.3, 40 CC, 72 C
See application file for complete search history.

(56) References Cited

U.S. PATENT DOCUMENTS

| | | | | |
|---|---|---|---|---|
| 4,035,051 A | * | 7/1977 | Guy ..................... | H01R 13/516 174/138 F |
| 5,401,905 A | * | 3/1995 | Lesser et al. ............... | 174/99 R |

(Continued)

FOREIGN PATENT DOCUMENTS

| | | |
|---|---|---|
| JP | H0795714 A | 4/1995 |
| JP | 2000253536 A | 9/2000 |
| JP | 2007-174821 A | 7/2007 |
| JP | 2009-077484 A | 4/2009 |
| JP | 2010-265947 A | 11/2010 |

OTHER PUBLICATIONS

European Search Report dated Jul. 23, 2014 in connection with European Application No. 12164426.4.
Notification of Reasons for Refusal, issued in corresponding Japanese Patent Application No. JP 2011-093968, dated Jun. 23, 2015.

*Primary Examiner* — Michael E Moats, Jr.
(74) *Attorney, Agent, or Firm* — Locke Lord LLP; James E. Armstrong, IV; Brian S. Matross (57) ABSTRACT

A hole for inserting a binding band is arranged through a gutter shape electric wire passing guide. A widening width guide groove for guiding the binding band is arranged at an inner surface of the electric wire passing guide so as to expand its width gradually from the hole toward an opening end of one sidewall of the electric wire passing guide. In condition that a plurality of electric wires is inserted in the electric wire passing guide, a tip end of the binding band is inserted from the guide groove into the hole. One side surface of the guide groove is curved convexly toward the projecting top between the hole and the opening end. The one side surface of the guide groove is inclined toward the projecting top between a bottom surface of the guide groove and the inner surface of the electric wire passing guide.

2 Claims, 6 Drawing Sheets

(56) References Cited

U.S. PATENT DOCUMENTS

| | | |
|---|---|---|
| 6,294,736 B1 * | 9/2001 | Takeda et al. .............. 174/72 A |
| 6,478,609 B1 | 11/2002 | Davis et al. |
| 7,780,459 B2 | 8/2010 | Yamamoto et al. |
| 2005/0257347 A1 | 11/2005 | Tsuchiya |
| 2007/0187144 A1 * | 8/2007 | Kato .......................... 174/72 A |
| 2009/0098762 A1 | 4/2009 | Horst |
| 2011/0147078 A1 * | 6/2011 | Satou et al. ................ 174/72 A |

* cited by examiner

BINDING BAND UNIT OF ELECTRIC WIRE PASSING GUIDE

TECHNICAL FIELD

This invention relates to a binding band unit of an electric wire passing guide, in which a wiring harness is bound by a binding band at the electric wire passing guide in an electric connection box or a harness protector arranged in a car.

BACKGROUND ART

Various binding band unit of electric wire passing guide for binding a plurality of electric wires (wiring harness) by a binding band made of synthetic resin at the electric wire passing guide in an electric connection box or a harness protector arranged in a car are provided.

For example, according to Patent Document 1 (not shown), it is described that a rectangular-shaped band passing guide hole for passing a synthetic resin binding band therethrough is provided at an end of a synthetic resin gutter-shaped harness protector for pas sing and protecting a wiring harness, and a band insertion groove continued to the band passing guide hole is provided.

According to Patent Document 2 (not shown), it is described that two band insertion holes having concavely curved inner surface is provided at a synthetic resign connector holder for receiving and positioning a connector junction member connecting wiring harnesses to each other, and a binding band is inserted through each of the band insertion holes, and thereby the wiring harness is bound and fixed. The binding band includes sawtooth shape lock projections at one surface of a band portion, and an insertion lock portion formed by an insertion hole and an inside lock piece at a base end thereof.

According to Patent Document 3 (not shown), it is described that an arc-shaped wall and a pair of through holes at both sides of the arc-shaped wall are provided at a synthetic resin connection box main body of a electric connection box such as a relay box or a fuse box, so as to be capable to insert a tip end of a binding band through one through hole and turn it like U-shape and insert it along an inclined outer surface of the arc-shaped wall into the other through hole by groping.

CITATION LIST

Patent Document

Patent Document 1: Japan Patent Application Published No. 2007-174821 (FIG. 2)
Patent Document 2: Japan Patent Application Published No. 2010-265947 (FIGS. 1, 5)
Patent Document 3: Japan Patent Application Published No. 2009-77484 (FIG. 5)

SUMMARY OF INVENTION

Objects to be Solved

According to the above biding band unit of an electric wire passing guide by prior art, when a tip end of binding band is inserted between the electric wire passing guide and the wiring harness into a hole for band insertion of the electric wire passing guide after inserting a plurality of electric wires (wiring harness) through the gutter-shaped electric wire passing guide, it is very difficult to insert the tip end of the binding band through the hole of the band insertion by groping. It is required to make this operation of inserting band more easily and more securely.

According to the above problems, an object of the present invention is to provide a binding band unit of an electric wire passing guide, which can act easily and securely an operation of inserting a binding band by groping into a hole for band insertion of the electric wire passing guide when a tip end of the binding band is inserted between the electric wire passing guide and the wiring harness into the hole for band insertion of the electric wire passing guide after inserting a plurality of electric wired (wiring harness) through the gutter-shaped electric wire passing guide.

How to Attain the Object of the Present Invention

In order to overcome the above problems and attain the object, the present invention is to provide a binding band unit of an electric wire passing guide, which includes a hole for inserting a binding band arranged through at the electric wire passing guide formed into gutter shape, and a widening width guide groove for guiding the binding band arranged at an inner surface of the electric wire passing guide so as to expand its width gradually from the hole toward an opening end of one sidewall of the electric wire passing guide, and in which a tip end of the binding band is inserted from the guide groove into the hole in a condition that a plurality of electric wires is inserted into the electric wire passing guide.

According to the above structure, the tip end of the binding band is caught easily and securely at a wide width opening end of the guide groove (expanding width) and guided along the guide groove into the hole by groping. A cut-out for inserting the binding band may be provided on a line extending from the hole (direction of projecting the band) at the other sidewall of the electric wire passing guide for binding the plurality of electric wires securely. The electric wire passing guide is arranged at an electric connection box or a harness protector.

In the binding band unit of the electric wire passing guide according to the present invention, one side surface of the guide groove near to an open end of a projecting top of the electric wire passing guide is curved convexly toward the projecting top between the hole and the opening end of the one sidewall.

According to the above structure, the tip end of the binding band is guided smoothly and securely along the curved one side surface of the guide groove (curved along a direction of inserting the electric wire) from the projecting top of the electric wire passing guide to the hole.

In the binding band unit of the electric wire passing guide according to the present invention, the one side surface of the guide groove is inclined toward the projecting top between a bottom surface of the guide groove to the inner surface of the electric wire passing guide.

According to the above structure, the tip end of the binding band led from the projecting top of the electric wire passing guide along the curved one side surface of the guide groove (curved along the direction of inserting the electric wire) is guided toward the bottom surface by the one side surface, which is inclined from the bottom surface of the guide groove with an obtuse angle. Thereby, the tip end of the binding band is guided smoothly and securely along the bottom surface to the hole (it is prevented that the tip end of the binding band is fallen off from the guide groove).

Effects of the Invention

According to the present invention, when the tip end of binding band is inserted between the electric wire passing guide and the wiring harness into the hole for band insertion of the electric wire passing guide after inserting a plurality of electric wires through the gutter shape electric wire passing guide, the tip end of the binding band can be caught easily and securely at the wide width opening end of the guide groove, so that the operation of passing the band can be acted easily and securely by groping. Thereby, operation of fixing the plurality of electric wires at the electric wire passing guide can be acted efficiently and workability of assembling the electric connection box or the harness protector having an electric wire passing guide can be improved.

According to the present invention, the tip end of the binding band can be efficiently inserted smoothly and securely from the projecting top of the electric wire passing guide along the curved one side surface of the guide groove.

According to the present invention, the tip end of the binding band can be guided along the inclined one side surface of the guide groove, so that it can be prevented that the binding band is fallen out from the guide groove.

DESCRIPTION OF EMBODIMENTS

FIGS. 1-6 show a first embodiment of a binding band unit of an electric wire passing guide according to the present invention.

The binding band unit of the electric wire passing guide includes a widening width guide groove 3 for guiding a binding band at an inner surface 2a of a gutter-shaped wire leading wall 2 (wire leading portion or electric wire passing guide) of a synthetic resin electric connection box main body 1 along a circumference of the wire leading portion; a hole 4 (FIG. 2), which the binding band is inserted through, at the wire leading wall 2 and continued to a narrower wide top end 3a of the guide groove 3 so as to guide easily and securely a tip end 5a of the synthetic resin binding band 5 (FIG. 6) through the widening width guide groove 3 into the hole 4 by groping.

Figure 1:
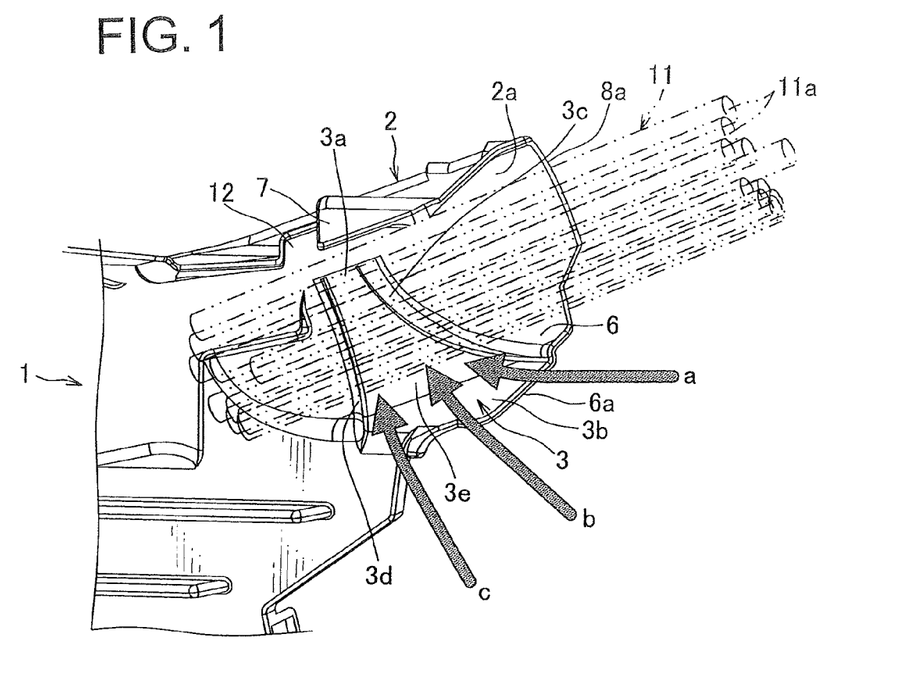
FIG. 1 is a perspective view of a first embodiment of a binding band unit of an electric wire passing guide according to the present invention.
Figure 2:
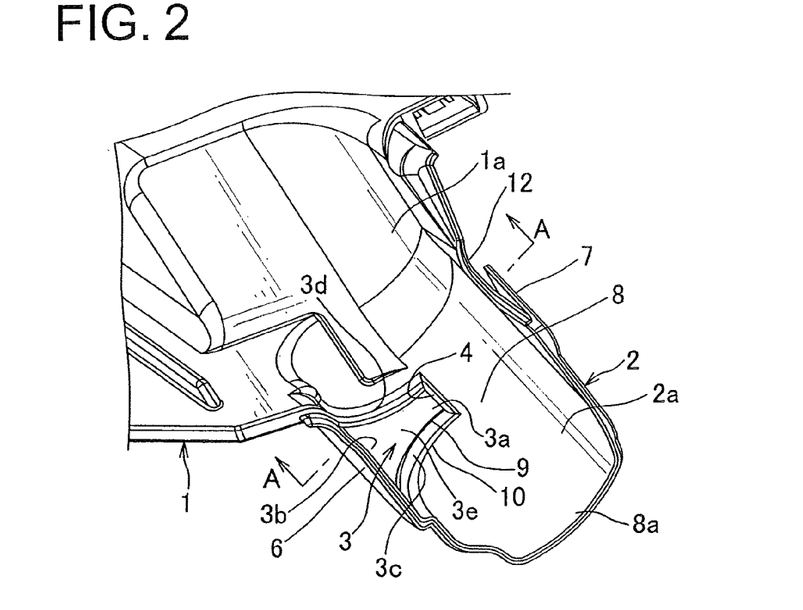
FIG. 2 is a perspective view of turning up-side-down the binding band unit of the electric wire passing guide shown in FIG. 1.

The wire leading wall 2 is a half-round curved wall (semicircular cross-section). The guide groove 3 is arranged from a lower end of one sidewall 6 of the wire leading wall 2 toward a top of an upper wall 8 in range of a half of the semicircular cross-sectional wire leading wall 2 (quarter round) as shown in FIG. 1 and FIG. 2 (by turning FIG. 1 up-side-down). The guide groove 3 has the widest portion 3b at a lower end of the one sidewall 6 (lower opening end 6a) and is narrowed gradually toward the top of the upper wall 8 by curved taper shape, and has the narrowest portion 3a in the vicinity of the slit shape hole 4 for inserting the binding band.

One side surface 3c at a front side of the guide groove 3 is formed curvedly so as to make an end of the side surface 3c at the widest portion approach toward a top end of the wire leading wall 2 (front end or front open end 8a). Furthermore, the one side surface 3c is inclined downwardly toward the front thereof so as to locate a nodal line 10 by the one side surface 3c and the inner surface 2a of the wire leading wall 2 forwarder than a nodal line 9 by the one side surface 3c and a bottom surface 3e of the guide groove 3, and form an angle between the bottom surface 3e and the one side surface 3c into an obtuse angle. The other side surface 3d of the guide groove 3 at a rear of the guide groove 3 is formed into not a curved shape but a line shape extending along a circumference of the wire leading wall 2, and a crossing angle by the other side surface 3d and the bottom surface 3e of the guide groove 3 or the inner surface 2a of the wire leading wall 2 is an right angle.

As shown in FIG. 1, a plurality of electric wires 11 (wiring harness) is inserted along the inner surface 2a of the wire leading wall 2. In such condition that the guide groove 3 covered by the wiring harness 11 cannot be seen, the tip end 5a of the binding band 5 (FIG. 6) is caught smoothly and securely along a direction of an arrow a, b or c by the widest entrance portion 3b (wide opening end) at a lower end of the guide groove 3 by groping and inserted into the guide groove 3. The tip end of the binding band 5 is guided between the wire leading wall 2 and an outer surface of the wiring harness 11 through the narrowest portion 3a of the guide groove 3 into the hole 4 (FIG. 2) for inserting binding band, and is led outwardly.

A slit-shape cut-out 12 is provided upwardly from a lower end of the other sidewall 7 of the wire leading wall 2 on a line extending along a circumference of the wire guide wall 2 through the hole 4 (direction of inserting the binding band), as shown in FIGS. 1 and 2. A base end of the wire leading wall 2 is integratedly continued to the connection box main body 1, and the inner surface 2a of the wire leading wall 2 is continued smoothly to an inner surface 1a of the connection box main body 1 by curved shape, so that a space of the wire leading wall 2 communicates to a space of the connection box main body 1.

Figure 3:
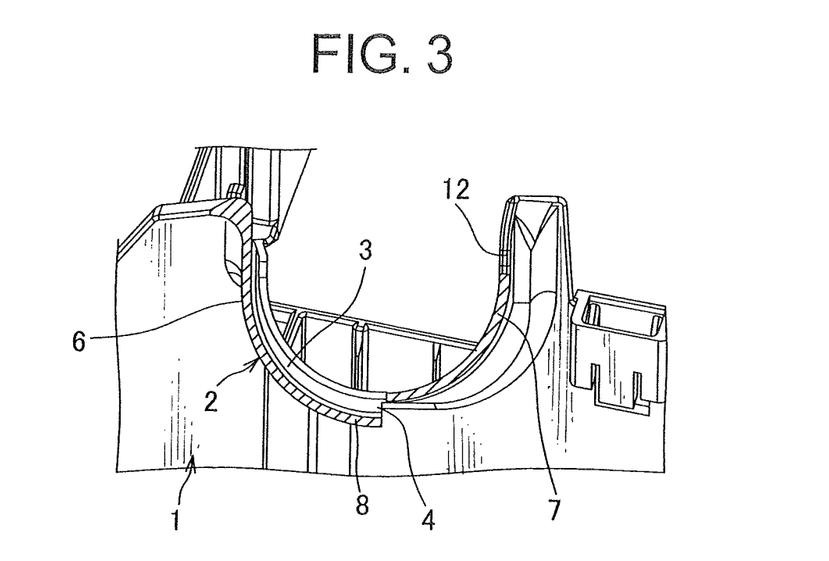
FIG. 3 is a cross-sectional view taken along the line A-A in FIG. 2.
Figure 4:
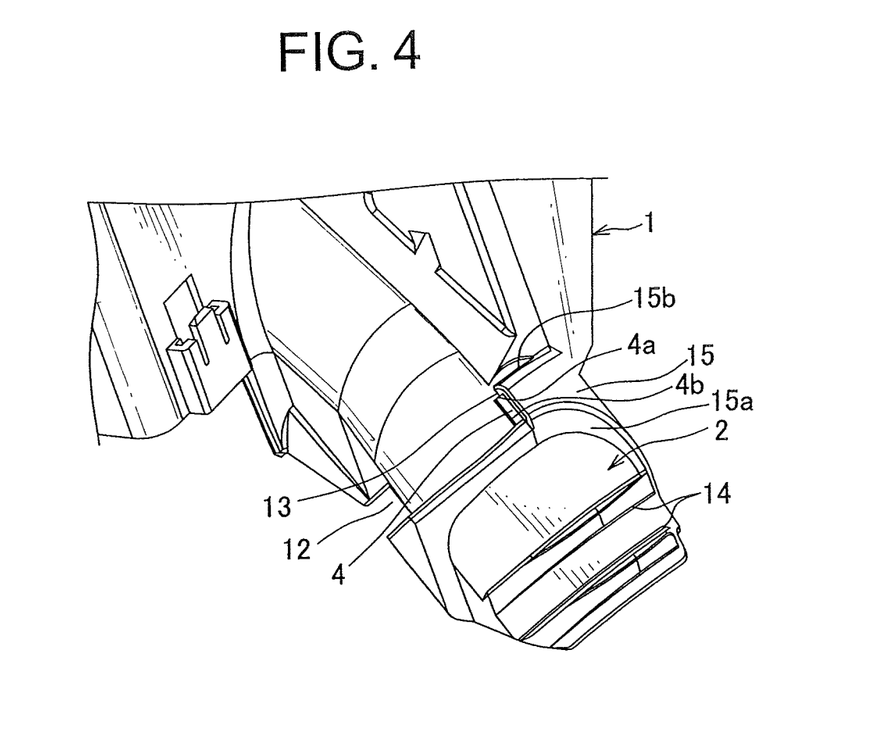
FIG. 4 is a perspective view from top of the binding band unit of the electric wire passing guide shown in FIG. 2.

The guide groove 3 is formed so as to project one half portion of the wire leading wall 2 (one sidewall 6 and a right-half of the top wall 8) outwardly as shown in FIG. 3. Thereby, the one half portion is continued to the other half portion (the other sidewall 7 and a left-half of the top wall 8) with a step shape. The hole 4 for inserting the binding band is arranged at a step portion 13 (FIG. 4). The hole 4 includes a short side 4a (FIG. 4) in a direction of thickness of the wire leading wall 2 and a long side 4b in a direction of lengthwise (front-rear direction) of the wire leading wall 2.

A rib 14 for preventing slippage of wound tape is provided at an outer surface of the wire leading wall 2 as shown in FIG. 4. A projecting wall 15 projecting outwardly in a radial direction of the wire leading wall 2 is arranged at the rear of the rib 14. The hole 4 is arranged at a top end of the projecting wall 15. The cut-out 12 is arranged on the line extending from the hole 4 along the circumference of the wire leading wall 2. A front wall 15a of the projecting wall 15 is inclined downwardly toward the front thereof and a rear wall 15b is perpendicular to the base end of the wire leading wall 2. The base end of the wire leading wall 2 is continued to the connection box main body 1.

A connection block 16 is mounted upward from a lower opening at the connection box main body 1 (frame) having the wire leading wall 2, thereafter, a synthetic resin lower cover 17 and a not-shown upper cover are mounted. The connection block 16 is configured to arrange electric components such as a relay and a fuse and busbar at a synthetic resin block main body. The plurality of electric wires 11a (FIG. 1) connected with the electric components as the wiring harness 11 is led outwardly from the wire leading wall 2 of the frame 1.

The lower cover 17 includes a plate-shaped wire supporting wall 18 oppositely at a lower side of the wire leading wall 2. The wire supporting wall 18 includes a rib 19 for preventing slippage of wound tape. Tape is wound for water protection. The wire leading unit is structured by the wire leading wall 1 and the wire supporting wall 18. The connection block 16 is locked inside the frame 1 by a lock member. The lower cover 17 and the upper cover are outside the frame 1 by each lock member 22. The frame 1 includes a receiving space passing in an up-down direction. The electric connection box 20 is formed by the frame 1, the lower cover 17, the upper cover and the connection block 16.

Figure 5:
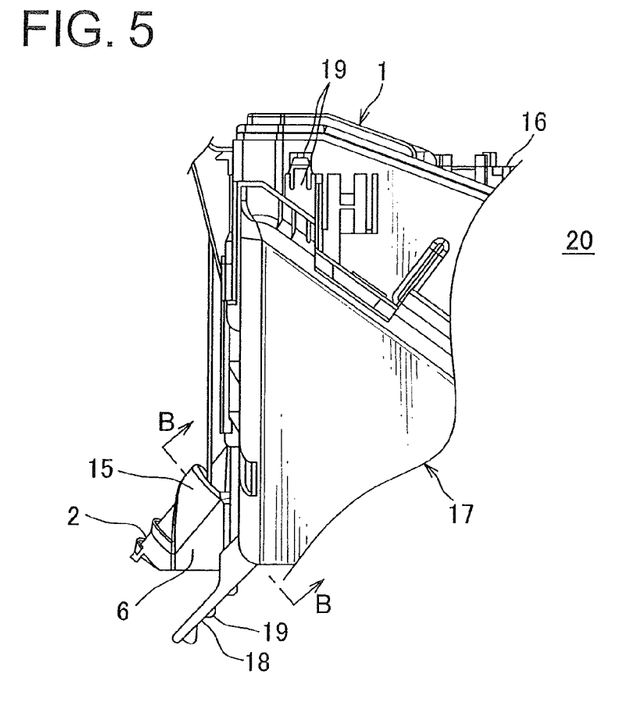
FIG. 5 is a side view of an example of an electric connection box having the binding band unit of the electric wire passing guide.
Figure 6:
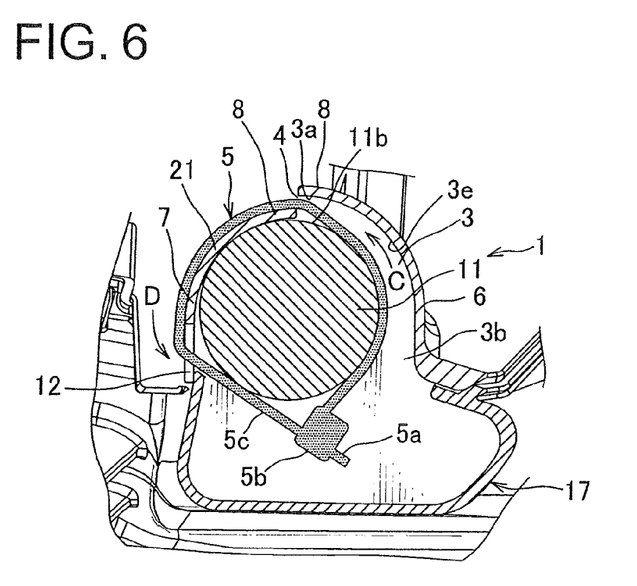
FIG. 6 is a cross-sectional view taken along the line B-B in FIG. 5 for showing that a wiring harness is fixed by a binding band.

Before the lower cover 17 is mounted, the tip end 5a of the binding ban 5 is inserted along the outer surface 11b of the wiring harness 11 into the guide groove 3 at the inside of the one sidewall 6 of the wire leading wall 2 of the frame 1 and projected outwardly from the hole 4, as shown in FIG. 6 showing the cross-sectional view taken the line B-B in FIG. 5. Thereafter, the tip end 5a is passed through the cut-out 12 of the other sidewall 7 of the wire leading wall 2 into the wire leading wall 2 along the direction D, and inserted into a frame shape lock portion 5b at an base end of the hinging band 5, and a sawtooth shape projections of a band portion 5c is locked by a lock hook provided inside the lock portion 5b. In FIG. 6, an unnecessary tip end 5a of the binding band 5 after binding wire leading wall 2 is cut off.

After the wiring harness 11 is bound and fixed by the binding band 5, the lower cover 17 is mounted at the frame 1. The outer surface 11b of the wiring harness 11 contacts tightly to an inner surface of the curved wall portion 21 between the hole 4 and the cut-out 12. An inner surface of the binding band 5 contacts tightly to an outer surface of the wall portion 21. The wiring harness 11 in such condition is pushed to and fixed on the wall portion 21 by a tensile force of the binding band 5.

FIGS. 7-11 show a second embodiment of the binding band unit of the wire passing guide according to the present invention. The second embodiment has the same basic structure, excluding a different size and shape of the wire leading wall 32 (that is different type of the electric connection box, i.e. the frame 31).

Figure 7:
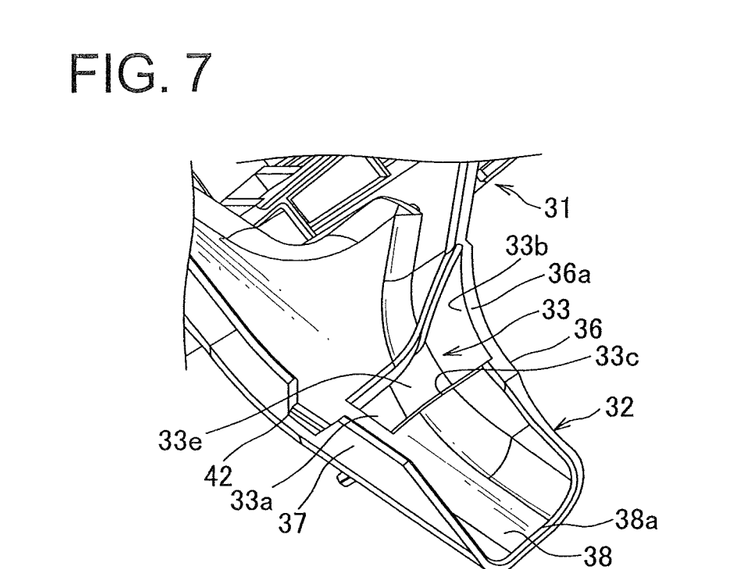
FIG. 7 is a perspective view from bottom of a second embodiment of the binding band unit of the electric wire passing guide according to the present invention.
Figure 8:
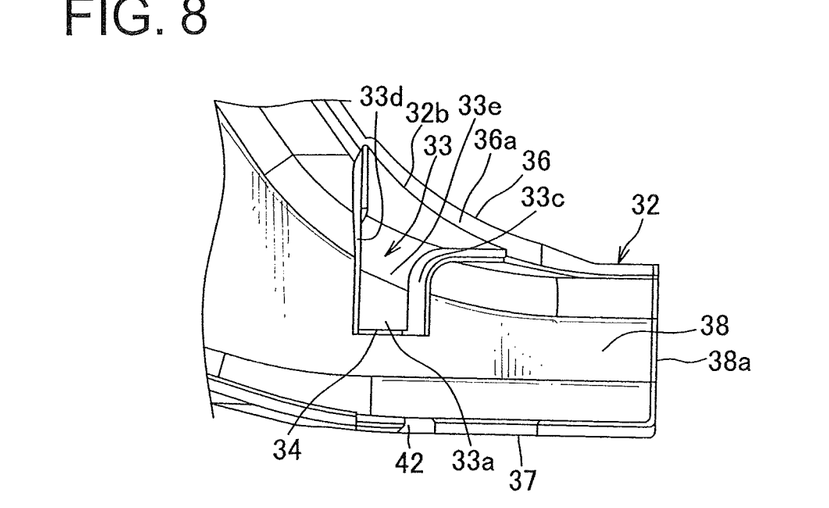
FIG. 8 is a plan view showing an inside of the electric wire passing guide shown in FIG. 7.
Figure 9:
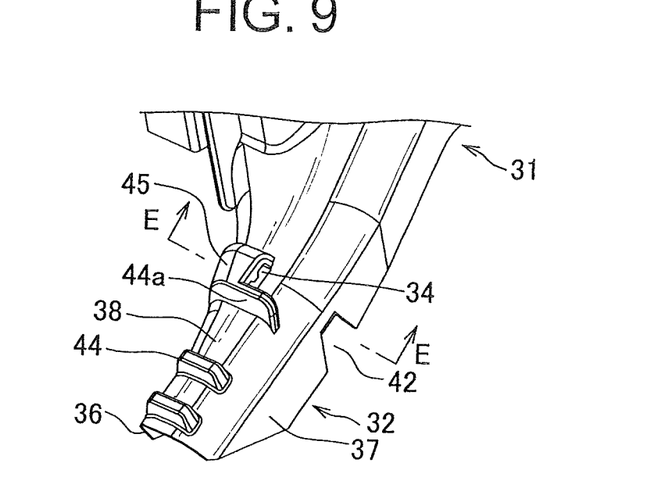
FIG. 9 is a perspective view from top showing an outside of the binding band unit of the electric wire passing guide shown in FIG. 7.

As shown in FIGS. 7 and 9, a wire leading wall 32 (wire leading portion or electric wire passing guide) is formed into not a semicircular cross-sectional shape but a rectangular gutter shape including a vertical one sidewall 36, and the other sidewall 37 at right and left thereof and an inclined shape upper wall 38 at an upper side. As shown in FIGS. 7 and 8, a guide groove 33 is provided from a lower end 36a (open end) of the one sidewall 36 of the wire leading wall 32 to a upper wall 38 at the inner surface of the wire leading wall 32. The guide groove 33 includes a wide width opening end 33b at a lower end and a narrow width top end 33a continued to a slit shape hole 34 for inserting the binding band 5.

As shown in FIG. 8, a side surface 33d at a rear side of the guide groove 33 extends straightly along a circumference direction of the wire leading wall 32, and intersects with a bottom surface 33e of the guide groove 33. The side surface 33c at a front side of the guide groove 33 is curved forwardly toward a front open end 38a of the wire leading wall 32, and inclined from the bottom wall 33e downwardly according to forwarding (in FIG. 7, the side surface 33c looks straightly by view angle, but actually as shown in FIG. 8, the side surface 33c is curved).

The tip end 5a of the binding band 5 (FIG. 11) can be inserted smoothly into the guide groove 33 by the curved and forwardly downward side surface 33c at the front side from the front side of the wire leading band 32 (direction indicated by the arrow a) or the traverse side of a radial direction (direction indicated by the arrow b and c), as similarly directions indicated by arrows a-c in FIG. 1. At position nearer to frame 31, a vertical outer wall of the frame 31 makes the operation of inserting the binding band 5 more difficult. For solving it, the tip end 5a of the binding band 5 can be inserted from the front side of the wire leading wall 32 (direction indicated by arrow a) into the guide groove 33 with good workability.

As shown in FIGS. 7 and 9, an cut-out 42 for guiding the binding band 5 is provided at the other side wall 37 of the wire leading wall 32. As shown in FIG. 9, a rib 44 for preventing slippage of wound tape is provided at an outer surface of the wire leading wall 32. An outwardly projecting wall 45 is provided at the wire leading wall 32 so as to be adjacent to a rear side of the most rear rib 44a. The hole 34 is opened at a side end of the projecting wall 45.

Figure 10:
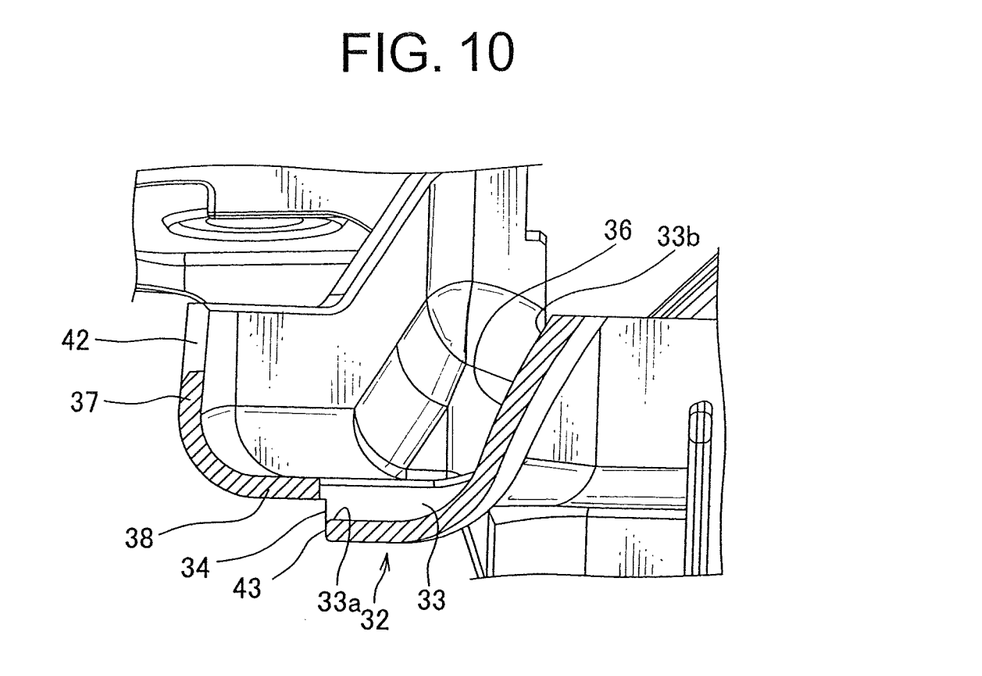
FIG. 10 is a cross-sectional view taken along the line E-E in FIG. 9.

As shown in FIG. 10, the one sidewall 36 having the guide groove 33 of the wire leading wall 32 is inclined outwardly, and the other sidewall 37 having the cut-out 42 is arranged vertically. The upper wall 38 continued to the both sidewalls 36, 37 is formed at a middle area thereof into a step shape so as to have a step portion 43, in which the hole 34 is opened.

Figure 11:
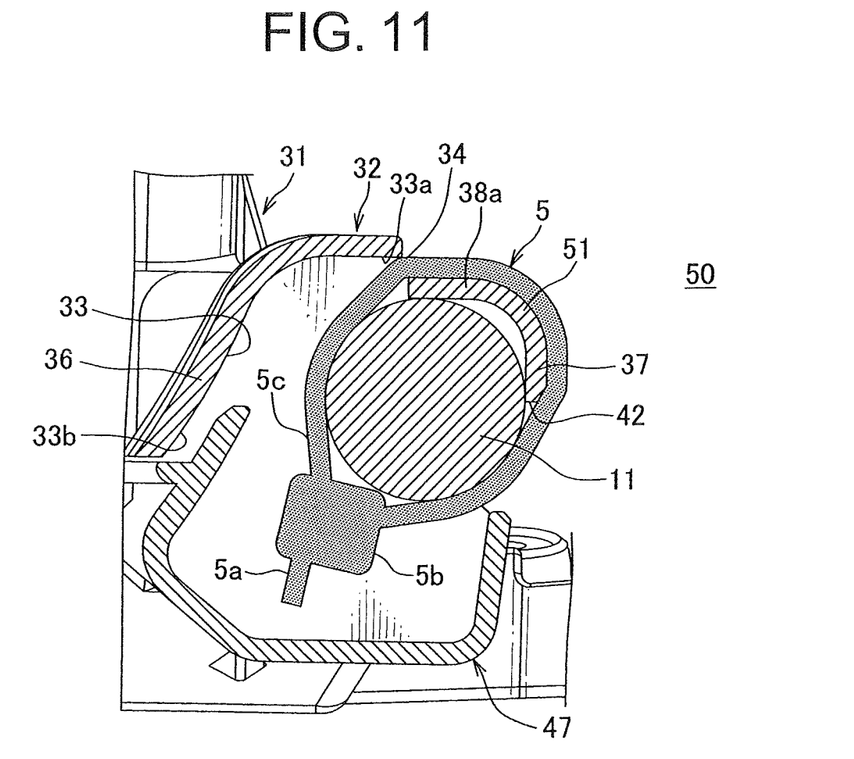
FIG. 11 is a cross-sectional view of main area of the electric connection box showing that the wiring harness is fixed by the binding band.

As shown in FIG. 11 (showing a condition of the mounted lower cover 47), before the lower cover 47 is mounted at the frame 31, the tip end 5a of the binding band 5 is inserted from the guide groove of the wire leading wall 32 into the hole 34, and then from the hole 34 through the outer side of a curved wall portion 51 formed by the one lower upper wall 38a and the sidewall 37, and inserted into and fixed at the lock portion 5b at he base end of the binding band 5. Thereby, the wiring harness 11 is bound to the inner surface of the wall portion 51 and fixed by the binding band 5. The lock portion 5b of the binding band 5 is received in the lower cover 47.

In each of the above embodiments, the gutter shape (more accurately inverted gutter shape) wire leading wall 2, 32 is arranged at the frame 1, 31 of the electric connection box 20, 50. The gutter shape wire leading wall 2, 32 having the widening width guide groove 3, 33 can be arranged not at the frame 1, 31 but at the lower cover 17, 47. In each of the above embodiments, the electric connection box 20 is formed by the frame 1, the connection block 16, the upper cover and the lower cover 17. Instead, the electric connection box can be formed by the upper cover, the lower cover 17 and electric components mounted in the lower cover 17, and the gutter shape wire leading wall 2, 32 having the widening width guide groove 3, 33 for inserting the binding band 5 can be arranged at the lower cover (the connection box main body).

In each of the above embodiments, the wire leading wall 2, 32 is arranged at the connection box main body 1, 31. Instead, the widening width guide groove 3, 33 for inserting the binding band 5 can be arranged at an inner surface of a wall portion (wire leading wall) at a middle area or at an end in lengthwise of the synthetic resin rectangular gutter shape harness protector, and the hole 4, 34 for inserting the binding band 5 continued to the guide groove can be arranged at the wall portion (wire leading wall).

In this case, similarly as the connection box main body 1, 31, in condition of inserting the wiring harness 11 through the harness protector, the tip end 5a of the binding band 5 is inserted between the outer surface of the wiring harness 11 and the wire leading wall of the harness protector into the guide groove 3, 33, and led out from the hole 4, 34. Thereby, the wiring harness 11 is bound and fixed at the wire leading wall 2, 32 by the binding band 5. The cut-out 12, 42 for guiding the binding band 5 may be preferably provided, but when a height of the wire leading wall 2, 32 is low, the cut-out 12, 42 can be eliminated (the wire leading wall of the connection box main body may be similar). The connection box main body 1, 31 and the harness protector can be called generally as a box shape main body)

INDUSTRIAL APPLICABILITY

In the binding band unit of the electric wire passing guide according to the present invention, after passing the plurality of electric wires (wiring harness) in the gutter shape wire passing guide, the tip end of the binding band can be inserted through the hole for inserting the binding band easily and securely even by groping.

The present inventions are described based in the embodiments as mentioned above, but the present invention is not limited in above embodiments. Various change and modifications can be made with the scope of the present invention.

REMARKS 2, 32 Wire leading wall (Electric wire passing guide)
3, 33 Guide groove
3c, 33c One side surface
3e, 33e Bottom surface
4, 34 Hole
5 Binding band
5a Tip end
6, 36 One sidewall
6a, 36a Opening end
8a, 38a Open end
11 Wiring harness (plurality of electric wires)

The invention claimed is:

1. A binding band unit of a gutter shape electric wire passing guide, comprising;
   a hole, through which a binding band is inserted, arranged through at the electric wire passing guide; and
   a widening width guide groove arranged at an inner surface of the electric wire passing guide so as to expand its width gradually from the hole toward an opening end of one sidewall of the electric wire passing guide for guiding the binding band,
   wherein a tip end of the binding band is inserted from the guide groove into the hole in a condition that a plurality of electric wires is inserted into the electric wire passing guide,
   wherein the hole is provided in a step formed by one side of the electric wire passing guide and an other side opposite to the one side of the electric wire passing guide, and the tip end of the binding band passes through the hole, and
   wherein one side surface of the guide groove near to an open end of a projecting top of the electric wire passing guide is inclined toward the projecting top from a bottom surface of the guide groove to the inner surface of the electric wire passing guide.

2. The binding band according to claim 1, wherein one side surface of the guide groove near to the open end of the projecting top of the electric wire passing guide is curved convexly toward the projecting top between the hole and the opening end of the one sidewall.

* * * * *